(12) United States Patent
Abts et al.

(10) Patent No.: US 8,806,244 B1
(45) Date of Patent: *Aug. 12, 2014

(54) SYSTEMS AND METHODS FOR ENERGY PROPORTIONAL MULTIPROCESSOR NETWORKS

(71) Applicant: Google Inc., Mountain View, CA (US)

(72) Inventors: Dennis Charles Abts, Eleva, WI (US);
Peter Michael Klausler, Middleton, WI (US); Hong Liu, Palo Alto, CA (US);
Michael Marty, Madison, WI (US);
Philip Michael Wells, Madison, WI (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,054

(22) Filed: Nov. 19, 2013

Related U.S. Application Data

(63) Continuation of application No. 12/818,580, filed on Jun. 18, 2010, now Pat. No. 8,601,297.

(51) Int. Cl.
 *G06F 1/32* (2006.01)
(52) U.S. Cl.
 USPC ............ 713/320; 713/300; 713/322; 713/600
(58) Field of Classification Search
 USPC .......................... 713/300, 320, 323, 324, 600
 See application file for complete search history.

(56) References Cited

U.S. PATENT DOCUMENTS

| | | | | |
|---|---|---|---|---|
| 8,601,297 B1 * | 12/2013 | Abts et al. | ..................... | 713/320 |
| 2003/0074464 A1 | 4/2003 | Bohrer et al. | | |
| 2008/0005303 A1 | 1/2008 | Rotithor et al. | | |
| 2008/0304519 A1 | 12/2008 | Koenen et al. | | |
| 2010/0115295 A1 | 5/2010 | Diab | | |
| 2011/0173352 A1 | 7/2011 | Sela et al. | | |

OTHER PUBLICATIONS

Al-Fares et al., "A Scalable, Commodity Data Center Network Architecture," SIGCOMM, Aug. 2008, pp. 63-74.
Barroso et al., "The Case for Energy-Proportional Computing," IEEE, Dec. 2007, pp. 33-37.
Borthakur, "The Hadoop Distributed File System: Architecture and Design,"The Apache Software Foundation, 2007, 14 pages.
Efficient Computing, 2 pages, retrieved from the Internet Apr. 28, 2010, <http://www.google.com/corporate/green/datacenters/step2.html>.

(Continued)

*Primary Examiner* — Paul Yanchus, III
(74) *Attorney, Agent, or Firm* — Lerner, David, Littenberg, Krumholz & Mentlik, LLP

(57) ABSTRACT

Energy proportional solutions are provided for computer networks such as datacenters. Congestion sensing heuristics are used to adaptively route traffic across links. Traffic intensity is sensed and links are dynamically activated as they are needed. As the offered load is decreased, the lower channel utilization is sensed and the link speed is reduced to save power. Flattened butterfly topologies can be used in a further power saving approach. Switch mechanisms are exploit the topology's capabilities by reconfiguring link speeds on-the-fly to match bandwidth and power with the traffic demand. For instance, the system may estimate the future bandwidth needs of each link and reconfigure its data rate to meet those requirements while consuming less power. In one configuration, a mechanism is provided where the switch tracks the utilization of each of its links over an epoch, and then makes an adjustment at the end of the epoch.

20 Claims, 8 Drawing Sheets

(56) References Cited

OTHER PUBLICATIONS

Ghemawat et al., "The Google File System," SOSP, Oct. 2003, pp. 29-43.

Greenberg et al., "VL2: A Scalable and Flexible Data Center Network," SIGCOMM, Aug. 2009, pp. 51-62.

Guo et al., "BCube: A High Performance, Server-centric Network Architecture for Modular Data Centers'," SIGCOMM, Aug. 2009, pp. 63-74.

Hatamkhani et al., "A Study of the Optimal Data Rate for Minimum Power of I/Os," IEEE Transactions on Circuits and Systems, vol. 53, No. 11, Nov. 2006, Retrieved from the Internet on Apr. 29, 2010, IEEE Xplore, pp. 1230-1234.

Jiang et al., "Indirect Adaptive Routing on Large Scale Interconnection Networks," ISCA, Jun. 2009, pp. 220-231.

Kim et al., "Adaptive Routing in High-Radix Clos Network," IEEE, Nov. 2006, 11 pages.

Kim et al., "Flattened Butterfly : A Cost-Efficient Topology for High-Radix Networks," ISCA, Jun. 2007, 12 pages.

Kim et al., "Microarchitecture of a High-Radix Router," ISCA, 2005, 12 pages.

Li et al., "Thrifty Interconnection Network for HPC Systems," JCS, Jun. 2009, 2 pages.

Lustre File System, <http://oracle.com/us/products/servers-storage/storage-software/031855.htm>, retrieved from the Internet Apr. 28, 2010.

Report to Congress on Server and Data Center Energy Efficiency Public Law 109-431, U.S. Environmental Protection Agency Energy Star Program, Aug. 2, 2007, 133 pages.

Scott et al., "The Black Widow High-Radix Clos Network," ISCA, IEEE, 2006, 12 pages.

\* cited by examiner

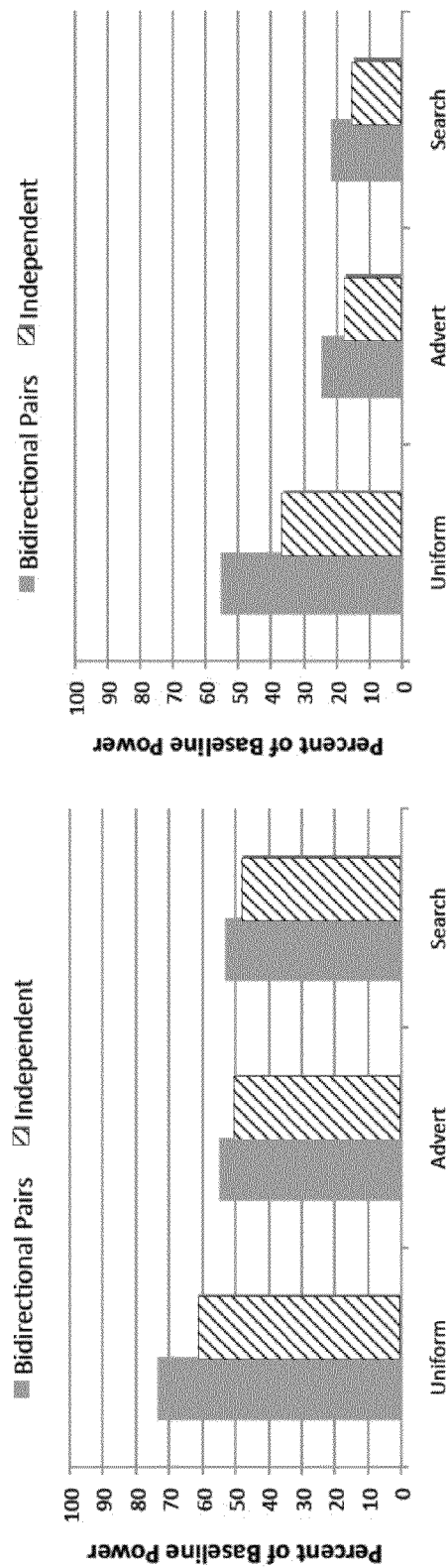

SYSTEMS AND METHODS FOR ENERGY PROPORTIONAL MULTIPROCESSOR NETWORKS

CROSS-REFERENCE TO RELATED APPLICATIONS

The present application is a continuation of U.S. patent application Ser. No. 12/818,580, filed Jun. 18, 2010, the disclosure of which is incorporated herein by reference.

BACKGROUND OF THE INVENTION

1. Field of the Invention

The present invention is generally directed energy consumption in computer datacenters. More particularly, the present invention is directed to congestion sensing to reduce consumed energy in multiprocessor systems such as network datacenters.

2. Description of Related Art

Large scale computing systems often employ datacenters or server farms to support a variety of applications and services. Such datacenters and server farms may employ many servers to handle the processing load. Each server consumes a certain amount of power when executing operations, and a different amount of power when idle. The cost of supplying power and its associated delivery and cooling are significant factors in the total expenditures of large-scale datacenters.

Studies have shown that datacenter computers rarely operate at full utilization. However, known datacenter networks often exhibit very little dynamic range. That is, the power consumed when the network is idle is nearly the same as the power consumed when the network is fully utilized. A primary reason is that high-speed channels typically operate in an "always on" mode regardless of whether they are flowing data packets. Without a reactivation latency hit, the channels cannot be quickly deactivated and then reactivated without negotiation from both sides of the channel to establish data rate, symbol alignment, and lane alignment.

Further exacerbating the problem is that deactivating a link appears as if the link is faulty to the routing algorithm, in which case packets must either be buffered or routed around the deactivated link. Buffering for extended periods of time is not feasible, leading to packet discards or backpressure depending on the network's flow control mechanism. On the other hand, changing routes in many networks require coordination among all nodes to ensure that no newly injected traffic takes a path that would cross an inactive link.

SUMMARY OF THE INVENTION

Systems and methods for developing energy proportional datacenter networks are provided. In accordance with aspects of the invention, independent flow control on unidirectional links enables energy efficiency for channels in a multiprocessor system.

As servers themselves become more energy proportional, the datacenter network can consume a significant fraction (e.g., up to 50%) of cluster power. Aspects of the invention address the design a high-performance datacenter network whose power consumption is more proportional to the amount of traffic it is moving.

In accordance with one embodiment, a method of providing energy proportional communication in a multiprocessor architecture is provided. The method comprises identifying a performance threshold for the multiprocessor architecture; periodically estimating a bandwidth need of each link in the multiprocessor architecture, including how many packets are due to be sent out of at least some of the links; and dynamically tuning one or more of the links based an estimated traffic intensity such that the performance threshold is satisfied at a minimum energy usage.

In one example, the multiprocessor architecture has a flattened butterfly topology. Here, the method may further comprise oversubscribing the flattened butterfly topology to reduce power consumption.

In another example, dynamically tuning the one or more links includes reconfiguring link speeds in real-time to match bandwidth and power consumption with traffic demand. In a further example, periodically estimating the bandwidth need employs credit-based link-level flow control to obtain congestion information of upstream receive buffers for the links.

And in yet another example, periodically estimating the bandwidth need includes evaluating channel utilization over predetermined timescale. In one alternative, the method further comprises removing any reactivating output ports from a list of legal adaptive routes; and draining output buffers of the output ports before reconfiguration. In another alternative, the method further comprises maintaining any reactivating ports in a list of legal adaptive routes; and buffering any packets destined for the reactivating ports until the reactivating ports become reactivated.

Optionally, each switch of the flattened butterfly topology tracks actual utilization of each of its links over an epoch, and makes an adjustment to the dynamic tuning at the end of the epoch. In one alternative, if the actual utilization is less than a target utilization, then link speed is detuned to a fraction of its current rate. In another alternative, if the actual utilization is greater than a target utilization, then link speed is increased to greater than its current rate. And in a further alternative, the adjustment includes evaluation of link utilization over a previous epoch.

In another example, the method further comprises reconfiguring each bidirectional link pair together to match a requirement for a channel having a highest load of the link pair. And in a further example, the dynamic tuning comprises retuning the selected links to either their lowest or highest performance mode without going through intermediate steps.

In accordance with another embodiment, a computer-readable medium is provided. The recording medium includes instructions stored thereon. The instructions, when executed by a processor, cause the processor to perform a method of providing energy proportional communication in a multiprocessor architecture. The method comprises the steps of identifying a performance threshold for the multiprocessor architecture; periodically estimating a bandwidth need of each link in the multiprocessor architecture, including how many packets are due to be sent out of at least some of the links; and dynamically tuning one or more of the links based an estimated traffic intensity such that the performance threshold is satisfied at a minimum energy usage.

In a further embodiment, an apparatus for providing energy proportional communication in a multiprocessor architecture is provided. The apparatus comprises memory for storing data and processor means. The processor means is for identifying a performance threshold for the multiprocessor architecture; periodically estimating a bandwidth need of each link in the multiprocessor architecture, including how many packets are due to be sent out of at least some of the links; and dynamically tuning one or more of the links based an estimated traffic intensity such that the performance threshold is satisfied at a minimum energy usage.

In one example, the processor means is operable to dynamically tune the one or more links by reconfiguring link speeds in real-time to match bandwidth and power consumption with traffic demand. In another example, the processor means is operable to periodically estimate the bandwidth need by employing credit-based link-level flow control to obtain congestion information of upstream receive buffers for the links.

In a further example, the processor means is operable to periodically estimate the bandwidth need by evaluating channel utilization over predetermined timescale. Here, the processor means is desirably further operable to remove any reactivating output ports from a list of legal adaptive routes and drain output buffers of the output ports before reconfiguration. Alternatively, the processor means is further operable to maintain any reactivating ports in a list of legal adaptive routes and buffer any packets destined for the reactivating ports until the reactivating ports become reactivated.

In another example, the processor means is further operable to reconfigure each bidirectional link pair together to match a requirement for a channel having a highest load of the link pair. And in another example, the dynamic tuning comprises retuning the selected links to either their lowest or highest performance mode without going through intermediate steps.

In a further embodiment, a method of providing energy proportional communication in a multiprocessor architecture is provided. The method comprises identifying a performance requirement for the multiprocessor architecture; periodically estimating a bandwidth need of each link in the multiprocessor architecture, including how many packets are due to be sent out of at least some of the links for a predetermined period of time; and dynamically tuning one or more of the links based an estimated traffic intensity to satisfy the performance requirement according to a specified energy usage.

BRIEF DESCRIPTION OF THE DRAWINGS

FIGS. 7A-B illustrate network power when dynamically detuning flattened butterfly links in accordance with aspects of the invention.

DETAILED DESCRIPTION

Figure 1:
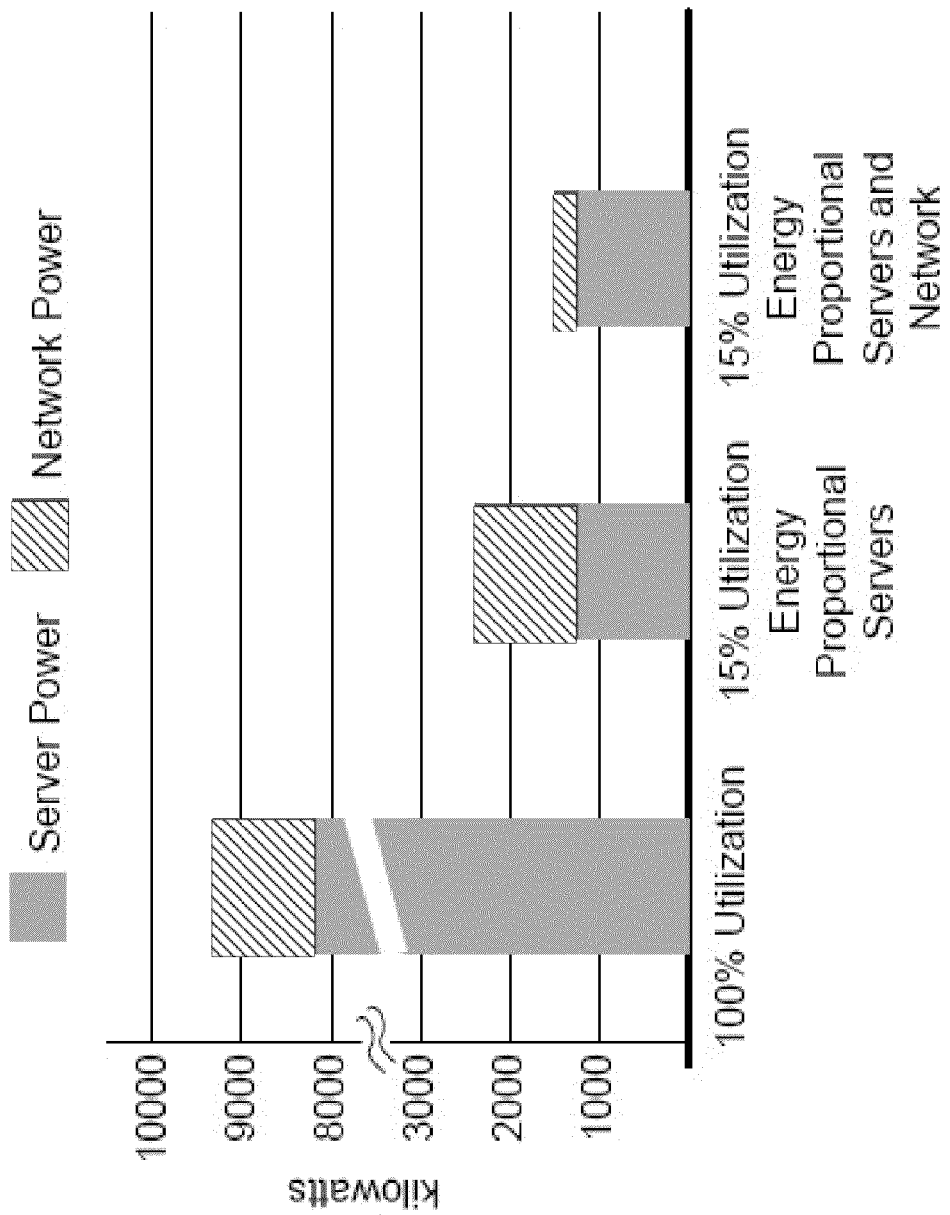
FIG. 1 illustrates an exemplary comparison of server power and network power.

The aspects, features and advantages of the present invention will be appreciated when considered with reference to the following description of embodiments and accompanying figures. The same reference numbers in different drawings may identify the same or similar elements. Furthermore, the following description does not limit the present invention; rather, the scope of the invention is defined by the appended claims and equivalents.

Servers and their processors are important targets to improve energy proportionality because they are today's primary power consumers in large scale computing systems. A multi-tiered datacenter network may consume little power, relative to dedicated servers, because the computation done via server I/O is significantly less than the local computation done using multi-core, multi-socket server. A high degree of oversubscription is exercised for multi-tiered network fabric. As an example of oversubscription, machines connected to the same rack switch (e.g., a first tier) have significantly more bandwidth to each other than they do to machines in other racks (e.g., second or tertiary tiers). The level of bandwidth oversubscription is typically an order of magnitude or more for each subsequent tier.

There are many factors that may drive adoption of high-performance datacenter networks with much greater bisection bandwidth, thereby eliminating or reducing oversubscription. It has been posited that less oversubscription enables dynamic resource allocation across large pools of servers. Thus clusters can be virtualized and servers can achieve better utilization because communication-intensive jobs can be run anywhere rather than being constrained to a single tier or rack (i.e., rack affinity).

Oversubscription may also couple the failure domains from the bandwidth domains. For example, if applications must schedule with rack affinity for bandwidth reasons, then the failure of a rack switch or power distribution unit can adversely affect service availability. For the same reasons, decoupling the failure domain from the available network bandwidth domain can enable greater opportunities for cluster-level file systems.

The emergence of faster storage technologies, like flash and phase-change memory, becomes another driver of increased cluster network bandwidth. A substantial increase in cluster bisection bandwidth, however, requires significantly more switching chips with faster, power-consuming links. Thus, it is likely that network power will become a first-order operating expenditure in future datacenter networks.

Some proposed solutions focus on providing a more energy-efficient communication channel by optimizing the physical characteristics of the link. Other approaches focus on the message passing interface (MPI) run-time system to active or deactivate links involved in the traffic pattern. This approach requires detailed knowledge of the traffic pattern a priori. However, unlike high-performance computer (HPC) systems, datacenter networks often run multiple workloads simultaneously, making the traffic pattern difficult or impossible to predict at the time of job scheduling.

Aspects of the invention take advantage of congestion sensing heuristics used for adaptive routing and employ such techniques to sense traffic intensity and dynamically activate links as they are needed. Likewise, as the offered load is decreased, aspects sense the lower channel utilization and reduce the link speed to save power.

Furthermore, in accordance with other aspects, the topology comparison is independent of any particular switch chip. A switch with sufficient radix, routing, and congestion-sensing capabilities allows building a flattened butterfly topology, which uses half the number of switch chips of a folded Clos topology. In addition, dynamically adjusting the power envelope of the network increase its energy proportionality.

FIG. 1 illustrates the impact of network power in an exemplary system. In this example, there are 32,000 servers, and it is assumed that each of the servers consumes 250 watts at peak load. Even with a high-performance datacenter network based on a folded Clos topology (i.e., fat trees), the network would consumes only 12% of overall power at full utilization. However, as servers typically operate at much lower levels of utilization, and are becoming more energy proportional, the network power cannot be ignored.

For instance, if the system is 15% utilized (servers and network) and the servers are fully energy-proportional, the network will then consume nearly 50% of overall power. At 15% load, making the network energy proportional results in a savings of 975,000 watts regardless of whether servers are energy proportional. Assuming an average industrial electricity rate of 0.07 per kilowatt-hour and a datacenter power usage effectiveness ("PUE" of 1.6), which represents a ratio of a datacenter's total power to the power used by computing equipment, this would result in a savings of approximately $3.8M over a four year service life of the network.

One goal is to provide a network that supports energy proportional communication. That is, the amount of energy consumed is proportional to the traffic intensity (offered load) in the network. Various aspects help achieve this goal. For instance, according to one aspect a datacenter network based on a flattened butterfly topology results in a more power-efficient network and therefore lowers operational expenditures. With a solid foundation for a high-performance power-efficient network, dynamic range is added by periodically estimating the future bandwidth needs of each link and reconfiguring its data rate to meet those requirements while consuming less power. This is discussed in detail below.

Figure 2:
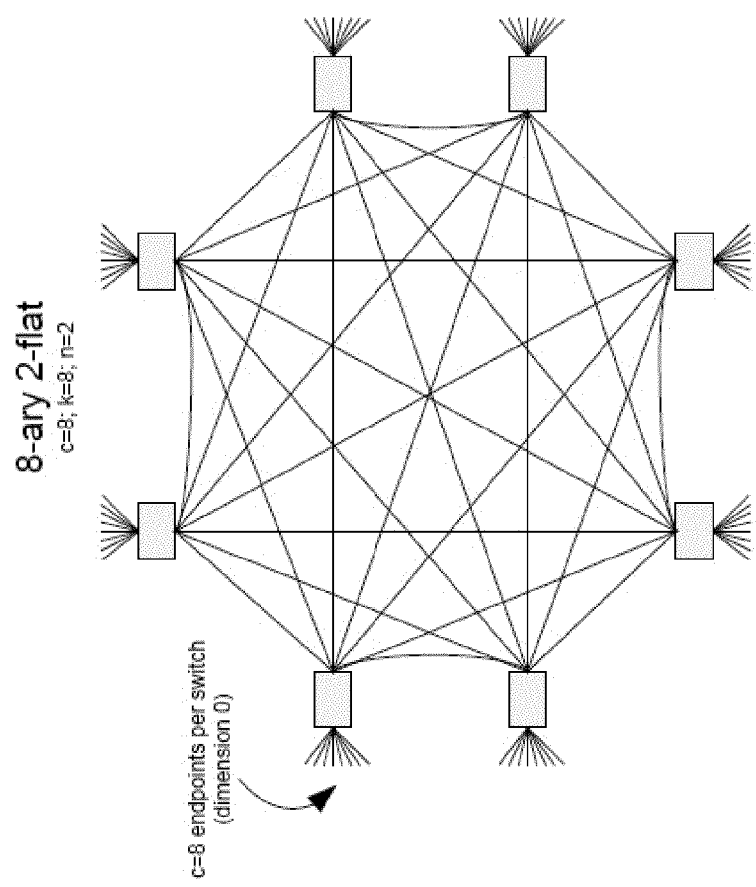
FIG. 2 illustrates a flattened butterfly topology for use with aspects of the invention.

FIG. 2 illustrates an exemplary flattened butterfly network topology that includes a number of interconnected switches. Each switch may include a processor, memory for buffering, and a routing mechanism. Each switch desirably has multiple input and output ports that may have links to different computing devices, such as servers or client computers, in the network.

The general flattened butterfly k-ary n-flat topology takes advantage of high port count switches to create a scalable, yet low-diameter network. This is accomplished by making the deliberate tradeoff of fewer physical links compared to a folded Clos, at the expense of increased routing complexity to load balance the available links. The flattened butterfly topology, for example, requires adaptive routing to load balance arbitrary traffic patterns, whereas a folded Clos has multiple physical paths to each destination and very simple routing.

A flattened butterfly is a multi-dimensional direct network, in many ways like a torus (k-ary n-cube), where every switch in the network is connected to hosts as well as other switches. The biggest difference is that in a torus, each dimension is connected as a ring, and in an flattened butterfly, each dimension is fully connected. That is, within a flattened butterfly dimension all nodes connect to all others.

This interconnection is depicted in FIG. 2, which shows 2-dimensional flattened butterfly (8-ary 2-flat) with 8×8=64 nodes and eight 15-port switch chips. Scaling the number of dimensions in a flattened butterfly essentially involves taking this single 8-switch group, replicating it 8 times, and interconnecting each switch with its peer in the other 7 groups (e.g., each upper-left switch connects to the other 7 upper left switches in the other 7 groups). Doing so yields an 8-ary 3-flat with $8^3$=512 nodes, and 64 switch chips each with 22 ports.

The flattened butterfly topology and packet traversal can also be explained with a simple metaphor. Consider a chessboard, with eight squares in each of two dimensions. Each square on the chessboard represents a switch that routes packets. Packets traverse the flattened butterfly in the same manner that a rook moves on a chessboard; namely, on each turn (hop), one can move to an arbitrary square (switch) in a given dimension.

Though a flattened butterfly scales exponentially with the number of dimensions, it may also be scaled linearly by increasing the radix. When possible, it is advantageous to build the highest-radix, lowest dimension flattened butterfly that scales high enough and does not exceed the number of available switch ports, in order to reduce the number of hops that a packet takes as well as the number of links and switches in the system.

As a flattened butterfly is scaled up, there are two properties of the topology that reduce both capital and operational expenditures. First, the topology can take advantage of packaging locality in the sense that nodes which are in close physical proximity can be cabled with inexpensive copper cables. Second, flattened butterfly implementations use fewer optical transceivers and fewer switching chips than a comparable folded Clos, and therefore consumes less power.

Figure 3:
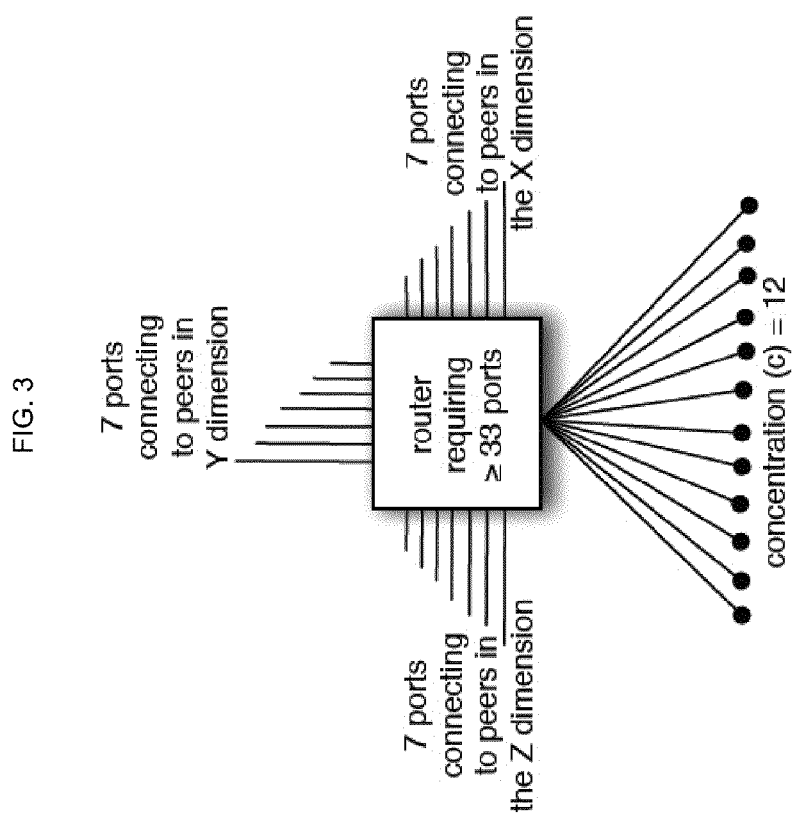
FIG. 3 illustrates a multiport router for use with aspects of the invention.

While in some respects it is desirable to employ high performance datacenter networks with little oversubscription, oversubscription remains a practical and pragmatic approach to reduce power as well as capital expenditures, especially when the level of oversubscription is modest. Oversubscription of a flattened butterfly can be achieved, if desired, by changing the concentration (c), or number of terminal nodes, at each switch. For example, as shown in FIG. 3, one could provide a concentration of 12 nodes per switch in our example 8-ary 3-flat using a 33 ported router which would allow the network to scale to: $ck^{n-1}$, or $12 \times 8^3$=6144 nodes. This may be expressed using the tuple (c, k, n) to describe a k-ary n-flat with c nodes per switch. Nonetheless, it is not necessary to oversubscribe a flattened butterfly network in order to provide the maximum performance ceiling when operating at full power.

A datacenter network based on the flattened butterfly topology uses less hardware compared to the equivalent performing network based on the folded Clos topology. This, by itself, results in a more power-efficient network and lower operating expenditures. To illustrate this power efficiency, an exemplary baseline system with 32 k server nodes is employed. The first-order part counts between a flattened butterfly and folded Clos may then be compared. The number of switch chips, in particular, dominates the power consumption of the network. It is also useful to evaluate the number of (expensive) optical transceivers required by the two topologies, as they tend to dominate the capital expenditure of the interconnect.

For the purposes of this comparison, the following assumptions are employed. First, a 36-ported switch (router node) is used where ports operate at 40 Gbps. Each switch consumes 100 watts regardless of whether of what combination of "always on" links it is driving, e.g., electrical backplane, electrical cable, or optical. Each host network interface controller (NIC) consumes 10 watts at full utilization. And the interconnect is comprised of the same switch chips throughout.

A second assumption simplifies the comparison even though the profile of a conventional switch chip may use 25% less power to drive an electrical link compared to an optical link. This represents a second-order effect in our comparison, and is actually less advantageous for the flattened butterfly, since other factors come into play such as packaging locality.

When comparing topologies, something must be held constant in order for the results to be meaningful. In this example, the comparison is based on a fixed bisection bandwidth. The number of ports p per switch per switch necessary to build a k-ary n-flat flattened butterfly with concentration c is determined according to the following: $p=c+(k-1)(n-1)$. Thus, a 32 k node 8-ary 5-flat with c=k=8 requires 36 ports. For purposes of this example, it is assumed that all short cables (e.g., on the order of less than about 5 meters) will use electrical links, and anything longer uses an optical link. The comparable folded Clos may be constructed from the same 36-ported switch.

For the flattened butterfly, the first dimension, which interconnects all the switches within a local domain, may use very short (e.g., on the order of less than 1 meter) electrical links. Similarly, all $c=k=8$ links from the hosts to switch can be electrical. In general, this packaging locality allows for e electrical links where $e=(k-1)+c$, which make a significant fraction $f_e$ of the overall links:

$$f_e = \frac{(k-1)+c}{c+(k-1)(n-1)}$$

In this example, $15/36$ (approximately 42%) of the flattened butterfly links are inexpensive, lower-power, electrical links. However, for ease of comparison it is assumed that all links are the same power efficiency, which does not favor the flattened butterfly topology. The total number of switches $S_{FBFLY}$ for the flattened butterfly is given by $_{SFBFLY}=k^{n-1}=8^4=4,096$.

For the folded Clos, 27 36-port switches are used to build a 324-port non-blocking router chassis for stage-2 and stage-3 of a multi-staged folded Clos network. It is assumed that the backplane connections within the 324-port stage-2 and stage-3 switches are free. Thus the folded Clos requires:

$$S_{stage3}\left\lceil\frac{32k}{324}\right\rceil = 102, S_{stage2}\left\lceil\frac{32k}{324/2}\right\rceil = 203$$

chassis, and the total number of switch chips required for the folded Clos is: $S_{Clos}=27\times(S_{tier3}+S_{tier2})=27\times305=8,235$.

In this example of a 32 k system built with 36-ported switches, there are 8,235 switches in the folded Clos; however, only ports on 8,192 switches are used. The results are summarized in Table 1, which shows a comparison of energy consumption of the folded Clos and flattened butterfly topologies for fixed bisection bandwidth.

TABLE 1

Topology Comparison

| Parameter Description | Folded Clos | FBFLY (8-ary 5-flat) |
|---|---|---|
| Number of hosts (N) | 32k | 32k |
| Bisection B/W (40 Gb/s links) | 655 Tb/s | 655 Tb/s |
| Number of electrical links | 49,152 | 47,104 |
| Number of optical links | 65,536 | 43,008 |
| Number of switch chips | 8,235 | 4,096 |
| Total power (W) | 1,146,880 | 737,280 |
| Power per bisection B/W (W/Gb/s) | 1.75 | 1.13 |

Overall, as Table 1 shows, the cluster with the flattened butterfly configuration may use 409,600 fewer watts than a folded Clos with the same bisection bandwidth. Assuming an average industrial electricity rate of 0:07 per kW hour and an average PUE of 1.6, using the flattened butterfly topology alone can result in over $1.6M of energy savings over a four-year lifetime of the cluster. Nonetheless, the "always on" nature of many networks leaves a lot of cost savings on the table without additional mechanisms. For instance, even the baseline flattened butterfly network consumes 737,280 watts, resulting in an estimated four year power cost of $2.89M.

As shown in the example above, the flattened butterfly topology inherently consumes less power than a bandwidth-comparable folded Clos. Efficient use of network power may be further improved by making communication more energy-proportional to the amount of data being transmitted. Aspects of the invention do this by dynamically tuning individual links to match the required performance (e.g., based on a predetermined criterion) while consuming as little power as possible. This is explained in more detail below.

High-speed channels may be constructed from several serialized lanes that operate at the same data rate, with a physical unit ("phit") being striped across all the active lanes. Channels commonly operate plesiochronously, where the core logic in the router operates at a frequency different than that of the I/O channels. All I/O channels can themselves run asynchronously, where frequency may vary a small amount ($\approx\pm100$ ppm) among all the ports.

Figure 4:
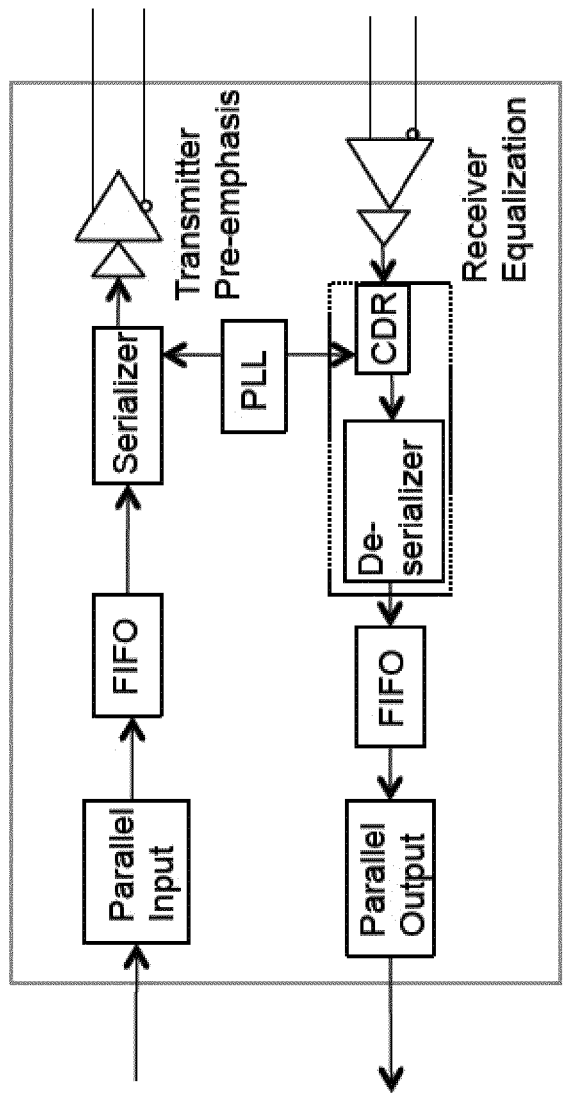
FIG. 4 illustrates a serializer/deserializer for use with aspects of the invention.

The physical layer (PHY) uses a serializer/deserializer ("SerDes"), an example of which is shown in FIG. 4. The SerDes accepts a phit of data and "squeezes" it onto a high-speed serial bit stream for transmission. On the other side of the channel, the SerDes receives the serial bit stream, where it reassembles the phit and passes it up to the data-link layer.

Frequency differences among ports and between ports and core router logic are absorbed by the input and output FIFOs of the SerDes. The problem, in terms of power, is that these channels are always on regardless of whether they are flowing data packets, because even with no data, they must still send idle packets to maintain byte and lane alignment across the multiple lanes.

Even though they are always on, plesiochronous channels often do have dynamic range, in terms of their ability to vary their data rate and power consumption. One example of dynamic channel range is the InfiniBand architectural specification, which defines multiple operational data rates. This is shown in Table 2 below.

| InfiniBand Support for Multiple Data Rates | | |
|---|---|---|
| InfiniBand data rate | Name | Data rate (Gb/s) |
| Single Data Rate | ×1 SDR | 2.5 Gb/s |
|  | ×4 SDR | 10 Gb/s |
| Double Data Rate | ×1 DDR | 5 Gb/s |
|  | ×4 DDR | 20 Gb/s |
| Quad Data Rate | ×1 QDR | 10 Gb/s |
|  | ×4 QDR | 40 Gb/s |

Figure 5:
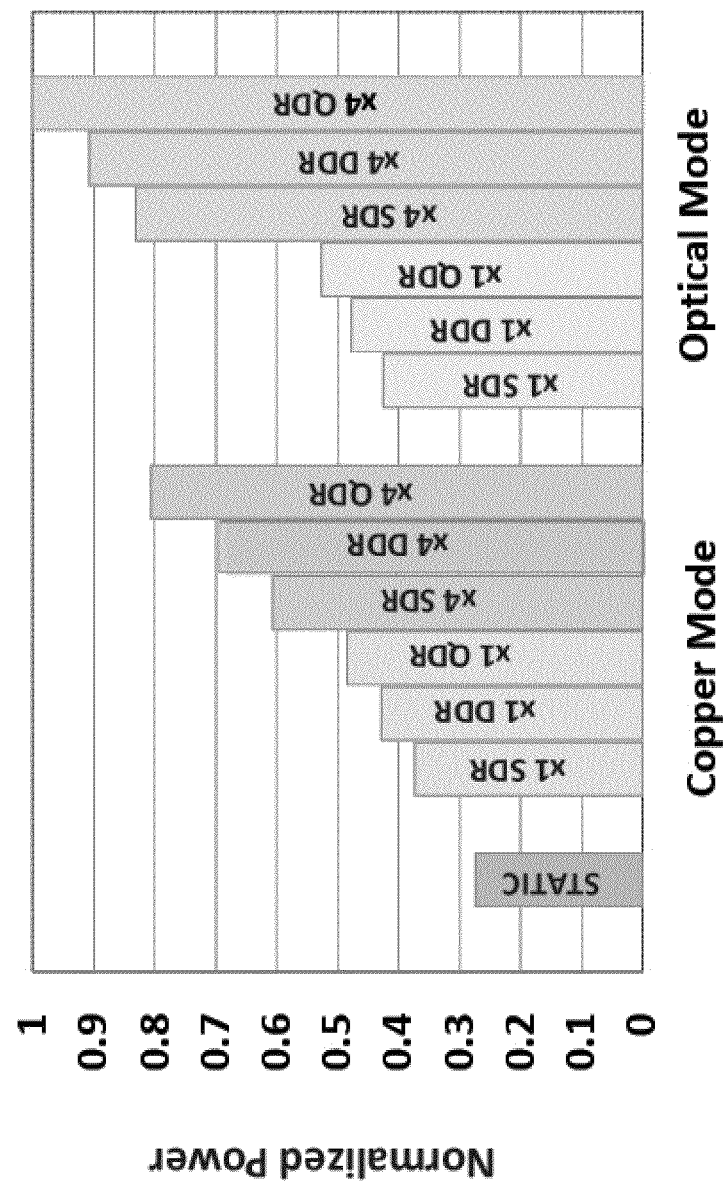
FIG. 5 illustrates the dynamic range of a switching device for use with aspects of the invention.

FIG. 5 illustrates the normalized dynamic range of an exemplary off-the-shelf InfiniBand switch where it is possible to manually adjust the link rates corresponding to Table 2. The maximum link rate of 40 Gb/s is obtained with four lanes running at quad data rate ("QDR") of 10 Gb/s each. However it is possible to operate the link with fewer lanes and at a lower data rate to reduce the power consumption of the always-on link. In this example, the dynamic range of the chip is 64% in terms of power, and 16× in terms of performance. In another example, the Cray YARC switch has 64 ports that similarly can operate as 1×, 2×, or 3× lanes with each lane operating at a range of frequencies from 1.25-6.25 Gb/s. Thus, each YARC link can transmit 1.25-18.75 Gb/s in each direction.

Both InfiniBand and YARC architectures allow links to be dynamically tuned, though the reactivation time of the link can vary from several nanoseconds to several milliseconds. For example, when the link rate changes by 1×, 2×, and 4× (e.g., InfiniBand's SDR, DDR and QDR modes), one can simply change receiving Clock Data Recovery ("CDR") bandwidth and re-lock the CDR. As many SerDes employ digital CDR at the receive path (See FIG. 4), the locking process for receiving data at a different data rate is fast, 50 ns-100 ns for the typical to worst case. On the other hand, the need to change PLL configuration when adding or removing lanes could be a slower process, taking around 5-10 μs. While an opportunity exists to improve the energy-efficiency of each channel, going forward one may expect more I/Os per switch package, operating at higher data rates, further increasing chip power consumption.

The above section outlines how existing plesiochronous links show dynamic range in their performance and power. In accordance with aspects of the invention, additional switch mechanisms are used to exploit those capabilities by reconfiguring link speeds on-the-fly (in real-time) to match bandwidth (and power) with the traffic demand. In doing so, communication can be made more energy proportional without fundamentally changing the topology, traffic routes, or even performance of the network. As used herein, real-time refers to the round-trip latency of a packet through the network. Real-time is desirably not longer than a 10 μs reactivation time, or, alternatively, not longer than 10 times the round trip latency.

One embodiment periodically estimates the future bandwidth needs of each link, and reconfigures its data rate to meet those requirements while consuming less power. Nonetheless, a couple of pragmatic requirements arise when taking this approach. First, this approach relies on the ability to accurately predict the future bandwidth requirements of the link. And second, this approach relies on the ability to tolerate a link reactivation that is non-instantaneous.

Predicting future bandwidth demands can be done, in classic computer architecture fashion, by using recent history as a guide. This may be accomplished with existing mechanisms used for congestion sensing in adaptive routing. For example, credit-based link-level flow control can deliver precise information on the congestion of upstream receive buffers, or channel utilization can be used over some predetermined timescale as a proxy for congestion.

However, because datacenter workloads are bursty over a wide range of timescales, care must be taken to avoid both averaging over too long of a timescale, and meta-instability arising from too-frequent reconfiguration. A number of strategies can be employed to tolerate reactivation latency. One option is to remove the reactivating output port from the list of legal adaptive routes and drain its output buffer before reconfiguration. This scheme relies on sufficient path diversity within the topology so that traffic that might normally route to that port is able to be redirected to other paths.

A second option is to continue to allow traffic to be routed to the output port, and then either drop packets (in a lossy network), or supply back-pressure (in a loss-less network) when the output buffers fill up. Any packet routed to that port will incur an additional latency as the link reactivates, but if the reactivation is small, this latency is likely to be tolerated by the application. This alternative relies on congestion-sensing and adaptive mechanisms to automatically route around the link that is undergoing reconfiguration in order to avoid excessive back-pressure or packet loss. Another option is to combine these two methods depending on the length of time the reactivation is expected to take.

Exploiting links' dynamic range is possible with other topologies, such as a folded Clos. However, there are three important factors that make a high-performance flattened butterfly a more appropriate fit. First, a flattened butterfly already relies on adaptive routing in order to balance the load and achieve high performance. These same mechanisms can be used to predict a link's future bandwidth demands. Second, a flattened butterfly contains abundant path diversity, which is necessary to adapt around reconfiguring links. A folded Clos on the other hand, has path diversity on the way up the tree, but none on the way down. Finally, in a flattened butterfly, the choice of a packet's route is inherently a local decision (though it must abide by global rules). This conforms to the aspect where the decision of link speed is entirely local to the switch chip.

With the inherent capabilities of the flattened butterfly topology, heuristics for power-optimizing links can range from simple to complex. According to one aspect of the invention, a mechanism is provided where the switch tracks the utilization of each of its links over an epoch, and then makes an adjustment at the end of the epoch. A target utilization is set for each link. For instance, tracking utilization for a link can be accomplished by using a bit array (e.g., 1024 bits) to record when a flow control unit (flit) is sent across the channel. An n-bit register may be used to record the utilization of the channel over an epoch of n cycles. Then, an index into the array may be maintained (requiring log 2 n bits) to indicate the current place within the epoch. Each time a flit is sent on the channel, a "1" is recorded into the bit array; otherwise a "0" is recorded. The array is desirably maintained in a circular manner so it records the utilization over the past n cycles. A population count (counting the number of 1's in the array) of the utilization array indicates the number of "busy" cycles out of the past n. The ratio of population count for the utilization array per epoch length gives a "utilization" value between 0.0 and 1.0 over the past n cycles. If the actual utilization is less than the target, the speed of the link is detuned to half the current rate, down to the minimum.

If the utilization exceeds the target, then the link rate is doubled up to the maximum. The target utilization should not be set too high, because that will saturate the network and lead to excessive performance degradation. In one example, the target utilization may be on the order of 25%, for instance ±5%. In another example, the target utilization may be on the order of 50%. And in yet another example, the target utilization may be on the order of 75%. The epoch duration is desirably sized to amortize the time needed to reactivate the link, but still react quickly enough to bursty and dynamic traffic patterns.

In one scenario, the link utilization over the previous epoch is used as the input to the decision function. Other common inputs for adaptive routing, such as output buffer occupancy or number of available credits, need not be employed because link utilization effectively captures both. If there is data to send, and credits to send it, then the utilization will go up, and the speed of the link should be upgraded. If there is no data to send or there aren't enough credits, then utilization will fall, and there is no reason to keep the link at a high speed. When links are undergoing reactivation, it is not necessary to explicitly remove them from the set of legal output ports. Rather, the system relies on the adaptive routing mechanism to sense congestion (based on e.g., output buffer occupancy) and automatically route traffic around the link.

According to a further aspect, a routing algorithm in accordance with the invention views each unidirectional channel in the network as a routing resource. However, the physical and data-link layers may treat a pair of unidirectional channels, in opposing directions, as a combined entity (typically called the link). Thus, the load on the link may be asymmetric. In other words, one channel may have a much higher load than the other. In any event, the link pair should be reconfigured together to match the requirements of the channel with the highest load.

According to another aspect, the ability to independently tune the data rates of the unidirectional channels of a link pair is evaluated. Based on the data in FIG. 5 that reflects an existing switch chip, there may not be much power saving opportunity for powering off links entirely. Nonetheless, as discussed below, the opportunity exists to power off links if switch chips offer a true "power off" state. Disabling a link entirely fundamentally changes the topology, but once again, the mechanisms required for a flattened butterfly are amenable to dynamic topology changes.

In one example, an energy-proportional flattened butterfly was evaluated using an event-driven network simulator. Here, a 15-ary 3-flat flattened butterfly (3,375 nodes) was modeled with no oversubscription, so that every host, on a uniform random traffic pattern, can inject and receive at full line rate. Links have a maximum bandwidth of 40 Gb/s, and can be detuned to 20, 10, 5 and 2.5 Gb/s.

A network was modeled with credit-based, cut-through flow control, and which adaptively routes on each hop based solely on the output queue depth. Switches are both input and output buffered. It is assumed the same reactivation time (defaulting to 1 μs) no matter what mode the link is entering.

Three workloads were examined—one synthetic and two taken from traces of a production datacenter at an Internet search company. "Uniform" is a uniform random workload, where each host repeatedly sends a 512 k message to a new random destination. "Advert" is a trace workload from an Internet advertising application, and "Search" is a workload from a web search application. In both applications, distributed file system traffic accounts for a significant fraction of traffic.

In order to model future applications which take advantage of such a high-performance network, the Advert and Search workloads were significantly scaled up from the original traces, and application placement was randomized across the cluster in order to capture emerging trends such as cluster virtualization. Though scaled up, these workloads share a common trait, namely, they are very bursty at a variety of timescales, but yet exhibit low average network utilization of 5-25%.

Figure 6:
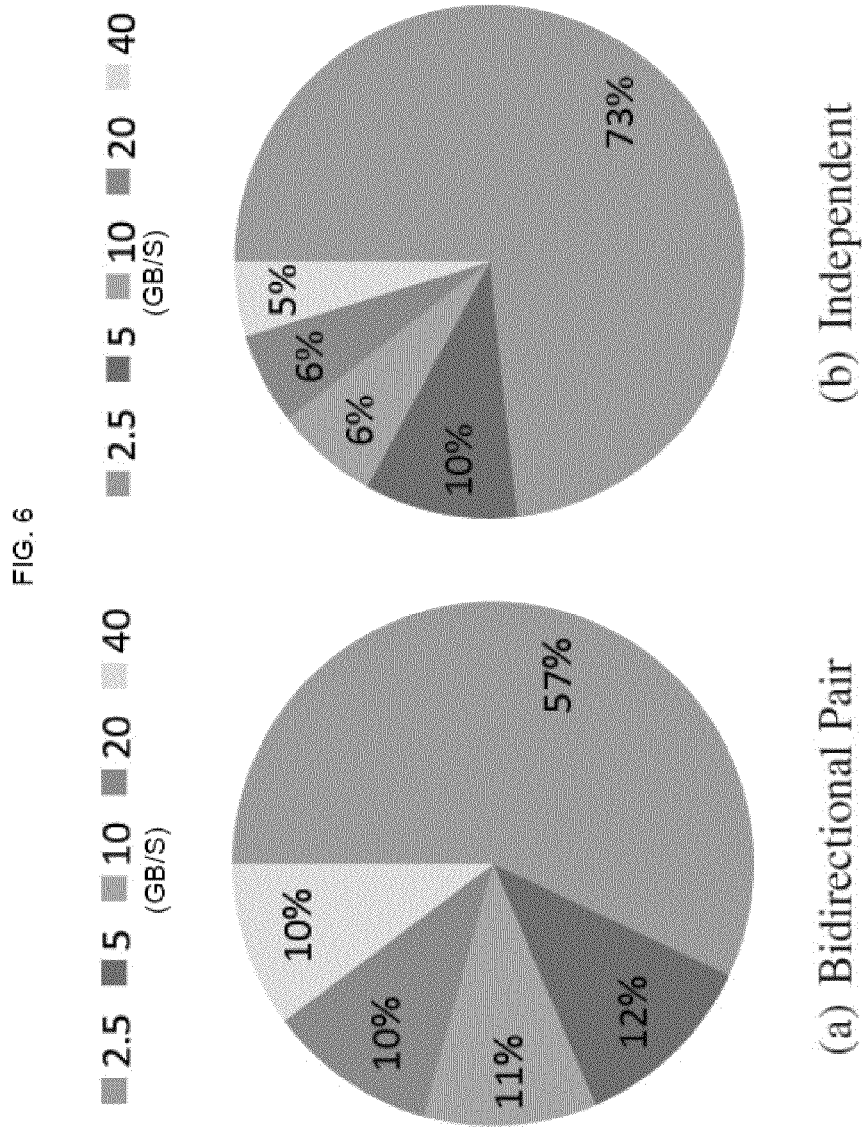
FIGS. 6A-B illustrate aggregate fractional link speed times for an exemplary workload.

Results from simulations with the workloads are discussed below. The results are compared to a baseline full power system, as well as one with ideal energy proportionality. A first set of experiments explored the ability of heuristics according to aspects of the invention to downgrade links to match the bandwidth required by the workload. FIGS. 6A-B show the aggregate fraction of time links spend at different speeds for the Search workload. These figures assume a fps reconfiguration time for the links, a 10 μs epoch, and a 50% target channel utilization.

The mechanisms described above for reducing the speed and power of a link were modeled, where a bidirectional link-pair must be tuned to the same speed (FIG. 6A), and the more flexible option, where a unidirectional channel can be tuned independently to different speeds (FIG. 6B).

It can be seen that energy proportionality is successful. In a workload with low average utilization, most links spend a majority of their time in the lowest power/performance state. It can also be seen that the ability to independently control each unidirectional channel halves the fraction of time spent at the faster speeds (e.g., 10, 20, and 40 Gb/s), and commensurately increases the fraction of time spent at the slowest speed (2.5 Gb/s).

This channel asymmetry arises in part due to workload characteristics. For example, depending on replication factor and the ratio of reads to writes, a file server in a distributed file system may respond to more reads (i.e., inject data into the network) than writes (i.e., receive data from the network), or vice versa. The charts look very similar for the uniform random workload (not shown), though the average channel utilization is very uniform. The reason is that the workload is bursty across the relatively short 10 μs epoch.

FIG. 7A shows the percent of power consumed by an energy proportional flattened butterfly network compared to a baseline flattened butterfly with all links operating at full bandwidth (40 Gb/s). Power is reported based on the amount of time each link spends at a given speed given the data from FIG. 5. Because links spend a majority of their time in low-power mode, the power for the entire network approaches the relative power of that slowest mode (42% of full power).

FIG. 7B shows the same experiments as in FIG. 7A, except that it is assumed here that the channels themselves are ideally energy-proportional with bandwidth themselves. Thus, a channel operating at 2.5 Gb/s uses 6.125% the power of a channel operating at full 40 Gb/s. It can be seen that together, energy proportional channels and the ability to independently tune each unidirectional channel provide a 6× advantage in terms of network power for both advertising and search workloads.

Figure 8A:
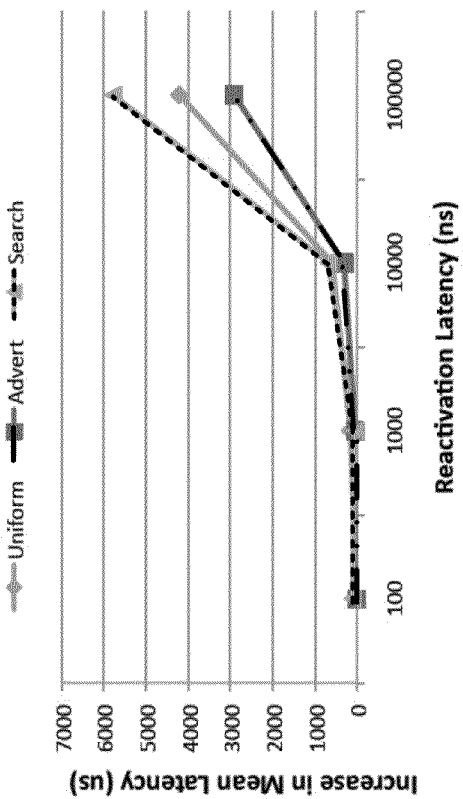
FIGS. 8A-B illustrate the sensitivity of target channel utilization and reactivation times in accordance with aspects of the invention.

The middle column of points (dotted and dashed line with square nodes) in FIG. 8A demonstrates the difference in performance when using an energy proportional flattened butterfly. This figure shows that the increase in mean latency, at a 50% target utilization and 1 μs reactivation time, is only 10-50 μs. Unlike many distributed scientific computations, typical datacenter applications can tolerate such small changes in latency. Though not shown, the additional mean latency with independent channel tuning is 75 μs for the two datacenter application traces and 200 μs for the uniform random workload.

A flattened butterfly network that always operated in the slowest and lowest power mode would consume 42% of the baseline power (or 6.1% assuming ideal channels). The energy proportional flattened butterfly embodiments of the present invention come within a few percent of that low power configuration in several cases. However, unlike all of the configurations above, a network that always operates in the slowest mode completely fails to keep up with the offered host load.

An ideally energy proportional flattened butterfly network would include ideal channels and zero reactivation time. When a link had something to transmit, it does so at full speed (and power), and when it does not have something to transmit, it consumes no power. In other words, the energy consumed by the network would exactly equal the average utilization of all links in the network. On the baseline system, the three exemplary workloads have an average utilization, and hence ideal power relative to the baseline, of 23% for Uniform, 6% for Search and 5% for Advert. Using the heuristics discussed herein, ideal independent channels, and a reasonable reconfiguration time of 1 μs, relative power of 36%, 17%, and 15% of baseline, respectively, can be achieved.

Target link utilization is an important factor when tuning link speeds. If set too low, then the network is missing out on opportunities to save power. If set too high, the network will be beyond saturation and performance will suffer. FIG. 8A illustrates three values for target link utilization: 25, 50, and 75%. For the workload traces, the latency increases substantially more at 75% utilization than at 25%. Running with utilization much higher than 75% is not feasible for these workloads, because the network saturates. While not shown, there is little difference for any of the workloads when using reactivation times of 1 μs or less, because these workloads are bursty: either they are sending data, and in (or transitioning to) high-power mode, or not sending data and in (or transitioning to) the low-lower mode. They do not spend much time in the intermediate modes when the reactivation times (and hence utilization measurement epoch) is small.

Figure 8B:
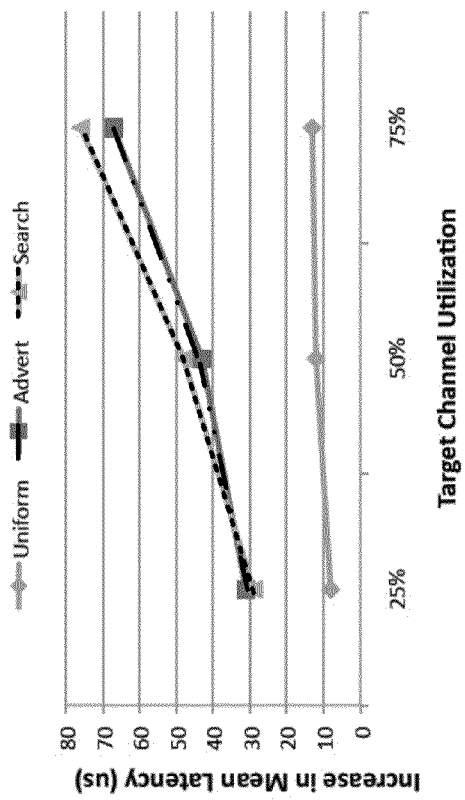

Next, results are reported assuming a range of link reactivation penalties, from 100 ns-100 µs, as shown in FIG. 8B. Here, the epoch is set to 10× the reactivation latency, which bounds the overhead of reactivation to 10%. Yet as the reactivation times rises to 10 µs, the increase in mean network latency approaches 1 ms. With a 100 µs reactivation, latency rises to several additional milliseconds, an overhead that can impact many different types of applications. Thus, the aspects presented herein are most beneficial when the reactivation time is less than 10 µs.

While a power graph is not shown, increasing the reactivation time (and hence utilization measurement epoch) decreases the opportunity to save power. Especially for the Uniform workload, which is less bursty than the traces at larger timescales, the power savings are effectively negligible for 100 µs. For the two traces at 50% utilization, the reduction in power savings for 100 µs is on the order of 2-5%. In practice, actual link reactivation time is generally close to 1 µs, which shows significant power reductions.

Thus, it has been shown that for an insignificant change in performance, an energy proportional flattened butterfly can deliver up to a 6.6× reduction in power. If this reduction is extrapolated to a full-scale network as discussed above, the potential additional four-year energy savings is on the order of $2.5M.

Additional aspects provide for enhanced reductions in network power. With the flexibility of the flattened butterfly topology, a heuristic is used to change the performance and power of individual links. However there remains opportunity for additional improvements as there is a 3× difference between experimental results and an ideally energy proportional network. Thus, in accordance with another aspect, when managing bursty workloads, it is advantageous to immediately retune links to either their lowest or highest performance mode without going through the intermediate steps. Optionally, it is advantageous to use per-link epochs with staggered end times to ensure alternative paths. In one example, the process also take into account the difference in link resynchronization latency to account for whether the lane speed is changing, the number of lanes are changing, or both. Opportunities also exist for more complex predictive models.

Additional aspects are directed to dynamic topologies in order to take advantage of future switch chips that offer a true power-off state. For instance, both Ethernet cards at either end of the link may be turned off. Turning the cards back on would require configuration by the driver or controller necessary to enable (activate) the links, and negotiating data rate between the sender/receiver, symbol alignment and lane alignment across multiple lanes of each link. From a flattened butterfly, links are selectively disabled, thereby changing the topology to a more conventional mesh or torus. For example, one can disable links in the flattened butterfly topology to make it appear as a multidimensional mesh. As the offered demand increases, additional wrap-around links may be enabled to create a torus with greater bisection bandwidth than the mesh at the expense of more power consumed by wrap-around links, although constructing a torus with radix k>4 requires additional virtual channels and awareness in the routing algorithm to avoid toroidal deadlocks. In one example, additional links (which are cabled as part of the topology) are dynamically powered on as traffic intensity (offered load) increases.

In an energy-proportional dynamic topology, it may be beneficial to employ an energy-aware routing algorithm capable of placing new routes with live traffic. There are other subtleties to consider. For example, in a network with credit-based flow control, one direction of a link cannot operate without the other direction active in order to receive credits back.

Independent of the wire protocols (e.g., Ethernet, InfiniBand, proprietary, etc.) there are certain requirements that enable energy proportional networks. Foremost is the ability to sense congestion at individual output links, and dynamically adapt around any congestion which results from either hotspot traffic or power-optimized links. Adaptive routing heuristics may be applied to energy-proportional switching. The decision to change the data rate of a link can be made, for example, by hardware, firmware executed by a processor in the network, or with an embedded processor as part of a managed switch in the network.

Furthermore, experimental results according to aspects of the invention have shown much more significant power-saving opportunities for links that are truly energy proportional. For example, a link configured for 1×SDR (2.5 Gb/s) should ideally use only 6.25% the power of the link configured for 4×QDR (40 Gb/s). In contrast, FIG. 5 shows that a conventional switch chip consumes 42% the power in 1×SDR mode.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of providing energy proportional communication in a multiprocessor architecture, the method comprising:
predicting, using one or more processors, a maximum amount of traffic intensity for one or more links of the multiprocessor architecture by determining channel utilization for each link of the one or more links over a predetermined time period;
removing reactivating output ports from a set of legal adaptive routes based on the determined channel utilization;
draining output buffers of the output ports before reconfiguration; and
adjusting, using the one or more processors, a throughput speed for a given link of the multiprocessor architecture based on the predicted maximum amount of traffic intensity so as to meet a minimum energy usage.

2. The method of claim 1, wherein the multiprocessor architecture has a flattened butterfly topology.

3. The method of claim 2, further comprising oversubscribing the flattened butterfly topology to reduce power consumption.

4. The method of claim 1, wherein adjusting the throughput speed of the given link includes reconfiguring a link speed in real time to match bandwidth and power consumption with traffic demand.

5. The method of claim 1, wherein predicting the maximum amount of traffic intensity employs credit-based link-level flow control to obtain congestion information of upstream receive buffers for the one or more links.

6. The method of claim 2, wherein each switch of the flattened butterfly topology tracks actual utilization of each of its links over an epoch, and makes an adjustment to the dynamic tuning at the end of the epoch.

7. The method of claim 6, wherein if the actual utilization is less than a target utilization, then the link speed is decreased to a fraction of its current rate.

8. The method of claim 6, wherein if the actual utilization is greater than a target utilization, then the link speed is increased to greater than its current rate.

9. The method of claim 6, wherein the adjustment includes evaluation of link utilization over a previous epoch.

10. The method of claim 1, further comprising reconfiguring each bidirectional link pair together to match a requirement for a channel having a highest load of the link pair.

11. The method of claim 1, wherein adjusting the throughput speed of the given link comprises retuning the given link to either its lowest or highest performance mode without going through intermediate steps.

12. A non-transitory computer-readable medium having instructions stored thereon, the instructions, when executed by one or more processors, cause the one or more processors to perform a method of providing energy proportional communication in a multiprocessor architecture, the method comprising the steps of:
predicting a maximum amount of traffic intensity for one or more links of the multiprocessor architecture by determining channel utilization for each link of the one or more links over a predetermined time period;
removing reactivating output ports from a set of legal adaptive routes based on the determined channel utilization;
draining output buffers of the output ports before reconfiguration; and
adjusting a throughput speed for a given link of the multiprocessor architecture based on the predicted maximum amount of traffic intensity so as to meet a minimum energy usage.

13. A system of providing energy proportional communication in a multiprocessor architecture, comprising:
a memory; and
one or more processors coupled to the memory, the one or more processors being configured to:
predict a maximum amount of traffic intensity for one or more links of the multiprocessor architecture by determining channel utilization for each link of the one or more links over a predetermined time period;
remove reactivating output ports from a set of legal adaptive routes based on the determined channel utilization;
drain output buffers of the output ports before reconfiguration; and
adjust a throughput speed for a given link of the multiprocessor architecture based on the predicted maximum amount of traffic intensity so as to meet a minimum energy usage.

14. The system of claim 13, wherein the multiprocessor architecture has a flattened butterfly topology.

15. The system of claim 14, wherein the one or more processors are further configured to oversubscribe the flattened butterfly topology to reduce power consumption.

16. The system of claim 13, wherein to adjust the throughput speed of the given link includes reconfiguring a link speed in real time to match bandwidth and power consumption with traffic demand.

17. The system of claim 13, wherein to predict the maximum amount of traffic intensity employs credit-based link-level flow control to obtain congestion information of upstream receive buffers for the one or more links.

18. The system of claim 14, wherein each switch of the flattened butterfly topology tracks actual utilization of each of its links over an epoch, and makes an adjustment to the dynamic tuning at the end of the epoch.

19. The system of claim 18, wherein if the actual utilization is less than a target utilization, then the link speed is decreased to a fraction of its current rate.

20. The system of claim 18, wherein if the actual utilization is greater than a target utilization, then the link speed is increased to greater than its current rate.

* * * * *